No. 764,926. PATENTED JULY 12, 1904.
P. K. DEDERICK.
METHOD OF FORMING BALES OR PACKAGES OF FIBROUS MATERIAL.
APPLICATION FILED JULY 18, 1903.
NO MODEL.
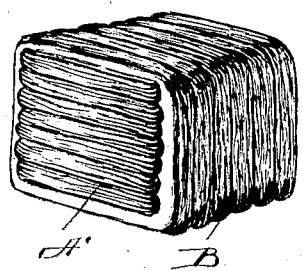
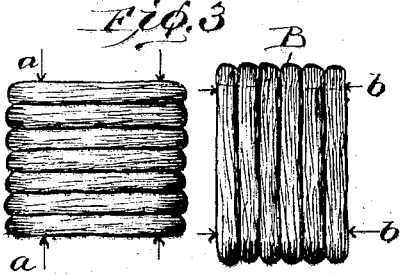
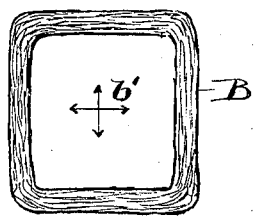
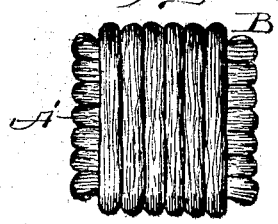
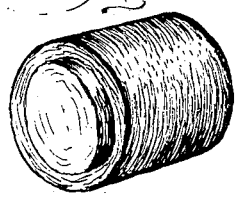
Witnesses
J. M. Fowler Jr.
Thomas Durant
Inventor
Peter K. Dederick
by Church & Church
his Attorneys No. 764,926. Patented July 12, 1904.

UNITED STATES PATENT OFFICE.

PETER K. DEDERICK, OF LOUDONVILLE, NEW YORK.

METHOD OF FORMING BALES OR PACKAGES OF FIBROUS MATERIAL.

SPECIFICATION forming part of Letters Patent No. 764,926, dated July 12, 1904.

Original application filed October 24, 1902, Serial No. 129,005. Divided and this application filed July 18, 1903. Serial No. 166,159. (No model.)

*To all whom it may concern:*

Be it known that I, PETER K. DEDERICK, of Loudonville, in the county of Albany, State of New York, have invented a certain new and useful Improved Method of Forming Bales or Packages of Fibrous Material; and I do hereby declare the following to be a full, clear, and exact description of the same, reference being had to the accompanying drawings, forming a part of this specification, and to the letters of reference marked thereon.

This application is a division of my application Serial No. 129,005; and the invention relates to improvements in the formation of bales or packages of fibrous material such as are given an initial compression and held in a compressed or condensed condition during transportation, storage, &c., or until it is desired to break the bale or package, the object of the invention being to produce a bale or package which in itself shall be so formed as to retain its form and density without necessitating the employment of the usual bands, ties, or coverings which are applied to the compressed material and fastened to prevent expansion, &c.

The invention consists in the process of forming bales or packages of loose fibrous material by compressing and telescoping sections together in such manner that they will serve as the means for confining each other; and, further, the invention consists in certain novel details, all as will be now described, and pointed out in the claims.

In the simplest form the bale or package is composed of an inner section pressed to expand, as in an ordinary bale, and an outer section or sections extending continuously around the inner section in a direction to confine the same and compressed transversely. The ends of the inner section, however, preferably extend beyond the outer section or sections to aid in retaining the latter.

In the accompanying drawings, Figure 1 and Fig. 2 are perspective views of bales or packages made in accordance with the present invention. Fig. 3 is a diagrammatic view illustrating the method of formation of the bale shown in Fig. 1. Fig. 4 is a view looking at the end of the outer section, Fig. 3. Fig. 5 is an elevation of the completed bale or package, Fig. 1.

Like letters of reference indicate the same parts.

The inner section of the bale or package illustrated in the drawings may be a single mass of hay or other loose fibrous material compressed to the desired density, or it may be composed of charges or layers compressed or rolled together corresponding closely to the ordinary quadrilateral bale or the ordinary roll or round bale adapted to be bound by metal bands passing around the same in one direction. The outer section B may also be formed of a single mass of loose fibrous material or of a series of charges or layers. The outer section surrounds the inner section in the form of a continuous band and is preferably compressed transversely of the layers or in the direction parallel with the central opening. It serves to confine the inner section, while the friction between the two sections and the expanded ends A' of the inner section serves to confine the outer section.

In the formation of a bale or package such as described the sections are formed independently of quadrilateral or round form, as desired. Thus in quadrilateral form, as illustrated in Figs. 3 and 4, the inner section is compressed, as indicated by the arrows $a$. The outer section is compressed, as indicated by the arrows $b$, and is usually expanded, as indicated by the arrows $b'$, and the sections telescoped together, as shown; but it is obvious that when the outer section is formed in charges or layers they may be formed into a continuous band on the bale or so placed separately, or the bale and band may be telescoped together as the sections or layers of the latter are formed until the band of the desired width is formed. The inner and outer sections may be of fibrous material differing in character, as one may be of hay and the other of straw; but it is preferred that they be of the same character, whereby the whole may be devoted to one use and no separation for use is necessary.

With this invention the producer may bale his product without the expense or bother of providing bale ties and bands, and the consumer is relieved of the necessity of removing such bands and disposing of the same, to say nothing of the elimination of the danger to machinery and stock incident to the use of the ordinary metal bands or covers now in use.

Having thus described my invention, what I claim as new, and desire to secure by Letters Patent, is—

1. The herein-described method of forming bales of loose fibrous material which consists in compressing and telescoping sections together; substantially as described.

2. The herein-described method of constructing bales of loose fibrous material which consists in forming and condensing the sections and telescoping said sections together transversely, whereby the expansions of the inner and outer sections are resisted by each other; substantially as described.

3. The herein-described method of forming bales of loose fibrous material which consists in compressing sections of the bale independently and telescoping them transversely; substantially as described.

4. The herein-described method of forming bales of loose fibrous material which consists in compressing an inner section, and compressing an outer section in charges or layers, and telescoping the same on the inner section; substantially as described.

PETER K. DEDERICK.

Witnesses:
P. K. DEDERICK, Jr.,
R. J. VAN SCHOONHOVEN.